United States Patent [19]

Zuch et al.

[11] 4,429,591
[45] Feb. 7, 1984

[54] DRIVE SHIFTING APPARATUS FOR VALVE CONTROL AND THE LIKE

[75] Inventors: Howard W. Zuch, Sugar Land; Paul Weber, Alvin, both of Tex.

[73] Assignee: Eim Company, Inc., Missouri City, Tex.

[21] Appl. No.: 252,322

[22] Filed: Apr. 9, 1981

Related U.S. Application Data

[63] Continuation of Ser. No. 20,167, Mar. 13, 1979, abandoned.

[51] Int. Cl.³ .................... F16H 35/00; F16K 31/02
[52] U.S. Cl. .................... 74/625; 192/48.1; 192/114 R; 251/130
[58] Field of Search .............. 74/625; 192/114 R; 251/130

[56] References Cited

U.S. PATENT DOCUMENTS

| | | |
|---|---|---|
| 831,974 | 9/1906 | Muller . |
| 858,651 | 7/1907 | Griffith . |
| 884,529 | 4/1908 | Seib et al. . |
| 1,133,318 | 3/1915 | Rindeleisch . |
| 1,942,549 | 1/1934 | Hampton . |
| 2,370,025 | 2/1945 | Edelman . |
| 2,745,294 | 5/1956 | Kron .................................. 74/625 |
| 2,775,908 | 1/1957 | Elliott et al. . |
| 2,886,365 | 5/1959 | Fox et al. . |
| 2,916,947 | 12/1959 | Morrell . |
| 3,292,452 | 12/1966 | Nordstrom et al. . |
| 3,302,430 | 2/1967 | Maursey . |
| 3,383,948 | 5/1968 | Palmer et al. ...................... 74/625 |
| 3,515,250 | 6/1970 | Cantalupo ......................... 74/625 |
| 4,022,309 | 5/1977 | Denkowski ..................... 192/114 R |
| 4,089,398 | 5/1978 | Stratienko ......................... 74/625 |

*Primary Examiner*—Lawrence J. Staab
*Attorney, Agent, or Firm*—Buell, Blenko, Ziesenheim & Beck

[57] ABSTRACT

A drive shifting apparatus for a valve control and the like is provided with a source of power for motor operation, a separate source of power for hand operation and a shifting means shiftable between the hand power and motor power sources. The shifting means may be a spring loaded clutch normally connecting the motor power source with the valve control, a latch means to hold the clutch in the hand power position against the spring pressure and a cam on the motor automatically releasing the latch when the motor is energized.

8 Claims, 9 Drawing Figures

DRIVE SHIFTING APPARATUS FOR VALVE CONTROL AND THE LIKE

This application is a continuation of my co-pending application Ser. No. 20,167, filed Mar. 13, 1979, now abandoned.

This invention relates to drive apparatus for power operated valves and the like. More particularly it relates to mechanism for shifting motor operation and hand operation of a valve control.

The use of valves to control flow in pipes and pipelines is old and well-known. In many instances it is desired to power valves for opening and closing. Power control is desired where a valve is in an awkward or remote location or where the size and mass of the valve makes hand operation inconvenient for normal operation. It is desired to be able to shift from motor operation to hand operation in the event it becomes necessary to operate the valve by hand. For example, an electrical power failure may make motor operation impossible. It is also desired that motor operation will override hand operation. For safety it is necessary to disengage the hand crank used for hand operation whenever the motor is in operation.

One form of drive shifting mechanism involves a clutch shiftable alternately between motor operation and hand operation. A well-known design employs a fly-ball governor driven by the motor and which shifts the clutch to motor position when power is supplied to the motor. Such an arrangement is shown in detail in U.S. Pat. No. 2,775,908, issued to Lynn T. Elliott et al.

We provide a source of power for motor operation and a separate source of power for hand operation. We further provide shifting means shiftable between motor position and hand position. We also provide drive means in engagement with the stem of the valve to be operated. We provide a motor input shaft, a hand input shaft, a clutch engaging surface in driven relation to each input, an output shaft, and a clutch member in driving relation to the output shaft and shiftable between engagement with each of the driven clutch engaging surfaces. We provide shifting means operable to shift the clutch member into driven engagement with one of the input shafts and spring means urging the clutch member into engagement with the other input shaft. We provide cam means driven by one of the input sources and latch means associated with the clutch shifting means and latchable with the cam means against the force of the spring means. We provide cam means effective to release the latch means when driven. We prefer that the spring means urge the clutch member into engagement with the motor input shaft and that the shifting means be operable to shift the clutch member into engagement with the hand input shaft against the force of the spring means. We further prefer that the cam means comprise at least two distinct cam surfaces for latching the shifting means and for tripping the latch member.

Other details, objects and advantages of our invention will become more apparent as the following description of a present preferred embodiment proceeds.

In the accompanying drawings we have illustrated a present preferred embodiment of the invention in which.

A valve of the sort to which this invention pertains customarily includes a threaded stem 1 engaged by a stem nut 2. For clarity of illustration bearings, housings, etc., have been omitted from the drawings. Conventional details of construction are shown, for example, in Elliott et al. U.S. Pat. No. 2,775,908, and Morrell U.S. Pat. No. 2,916,947. Stem nut 2 is surrounded by and connected to a worm gear 3 engaging a worm 4. When the shaft of worm 4 is rotated, that in turn causes rotation of worm gear 3 and stem nut 2. Stem nut 2 is locked between bearings with the result that rotation of stem nut 2 cause stem 1 to be moved in or out of the valve body.

Figure 1:
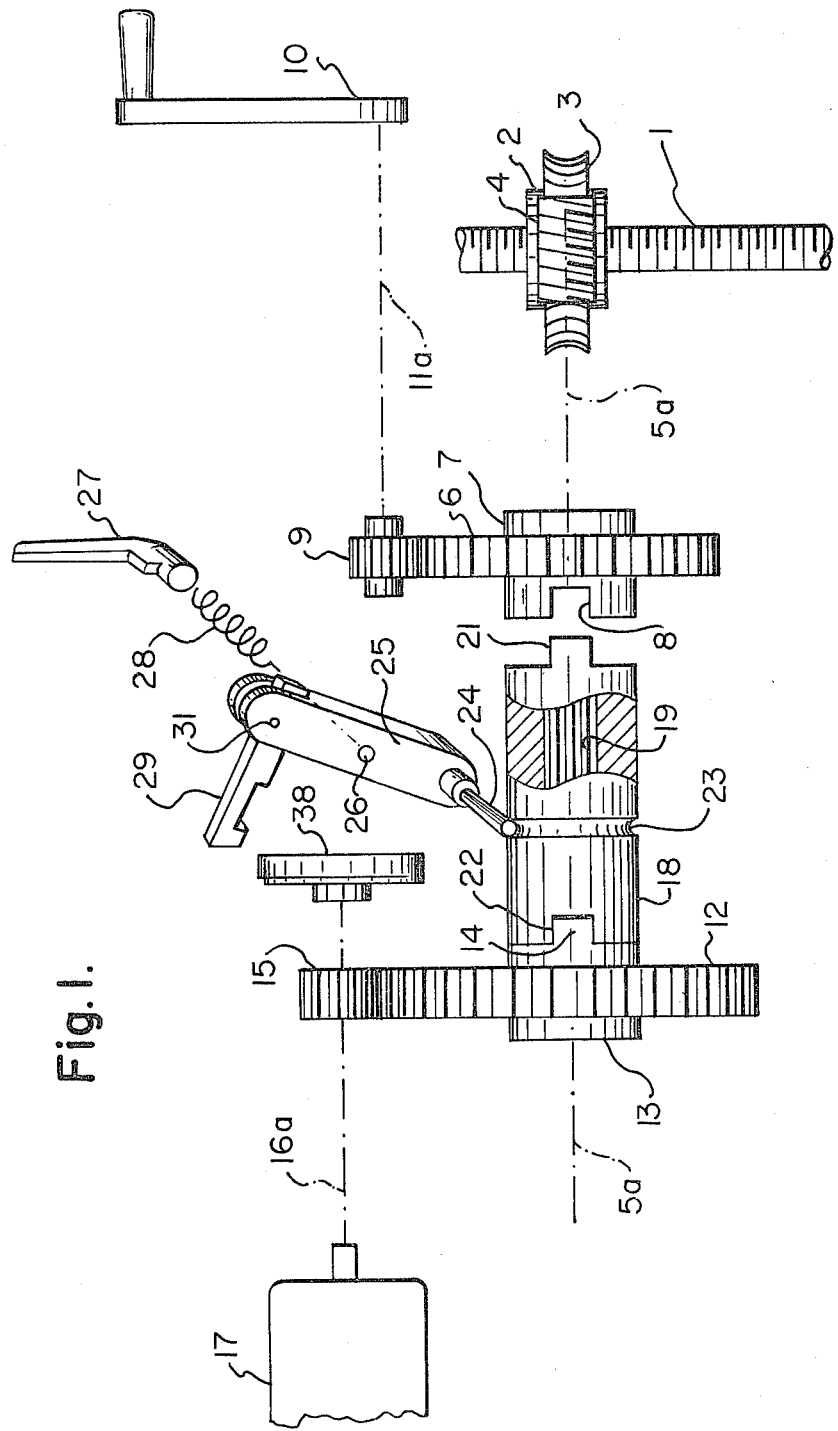
FIG. 1 is a schematic elevational view of a valve control and drive shifting apparatus embodying our invention.

Worm 4 is keyed on a shaft 5 (FIG. 2) having a central axis 5a (FIG. 1). A hand input gear 6 is mounted on a sleeve 7 which is free to rotate on shaft 5. The collar includes a clutch jaw 8 on the side facing motor input gear 12. Gear 6 is driven by a gear 9 which is connected to a hand crank 10 by a shaft 11. Motor input gear 12 is mounted on a collar 13 which is also rotatable upon shaft 5. Collar 13 has a clutch projection 14 on the side facing hand input gear 6. Gear 12 is driven by a gear 15 mounted on a shaft 16 having an axis 16a. Shaft 16 is driven by an electric motor 17.

A clutch member 18 is mounted on shaft 5 and slidable between motor input gear 12 and hand input gear 6. Clutch member 18 has internal splines 19 (FIG. 1) which engage splines 20 (FIGS. 2 and 3) on shaft 5. Clutch member 18 is thereby movable axially upon shaft 5 between gears 6 and 12 but is rotatable only with shaft 5. Clutch member 18 has a clutch projection 21 movable into and out of engagement with clutch jaw 8 and a clutch jaw 22 movable into and out of engagement with clutch projection 14. A groove is formed circumferentially around clutch member 18.

Figure 3:
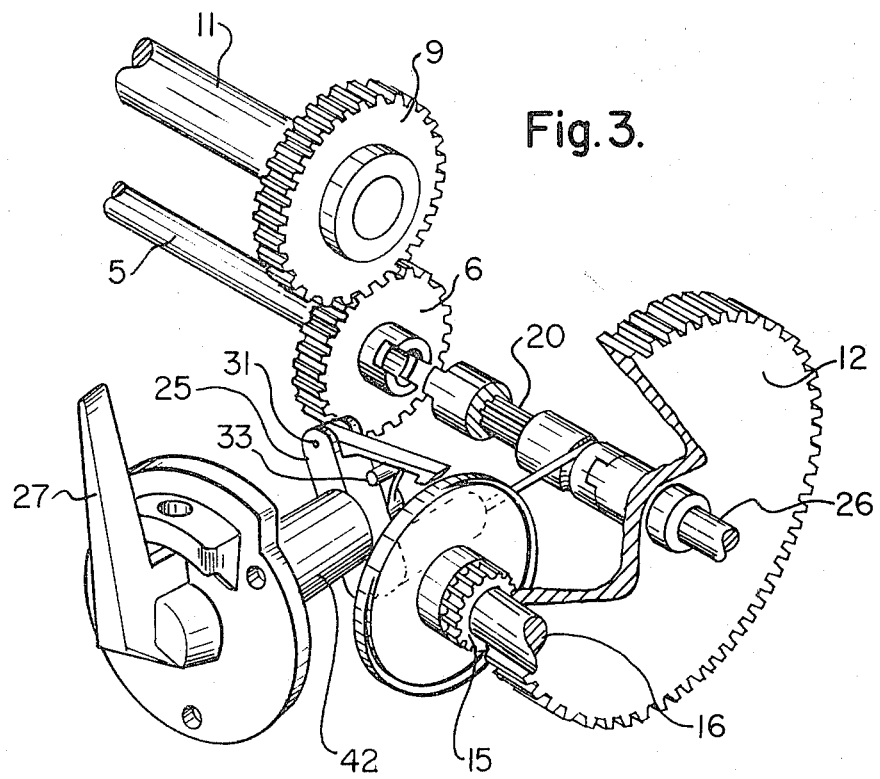
FIG. 3 is a perspective view of the apparatus shown in FIG. 2 with the clutch engaged for motor operation.

A pin 24 projects from an arm 25 which is mounted at 26 on a shaft connected to handle 27. Pin 24 extends into recess 23 on clutch member and inhibits sliding of clutch member 18 on shaft 5 except as pin 24 is also moved. A spring 28 surrounding the shaft urges rotation of arm 25 and lever 27 and the connecting shaft to a motor operated clutch position as shown in FIGS. 1 and 3. Arm 25 is mounted on the shaft with some lost motion sufficient to accommodate misalignment between the clutch jaws and clutch projections.

A latch 29 is mounted in a slot 30 in the end of arm 25 opposite to pin 24. The latch is pivotably mounted to arm 25 by a pivot pin 31. Trip member 32 is fixed to arm 25 below latch 29. Trip 32 has a projecting pin 33 which limits pivotal movement of latch 29. Trip 32 is omitted from FIG. 1 but is shown in FIGS. 2–9. The face of arm 25 which forms one side of slot 30 has been broken away in FIGS. 4–9 for clarity of illustration but may be seen in FIGS. 2 and 3.

Latch 29 has a seat 34 which forms an overhanging lip 35 at the free end of the latch. The extreme end of latch 29 has a tapered face 36. A spring 37 fitted in a pocket in arm 25 urges the end of latch 29 toward trip pin 33.

Figure 2:
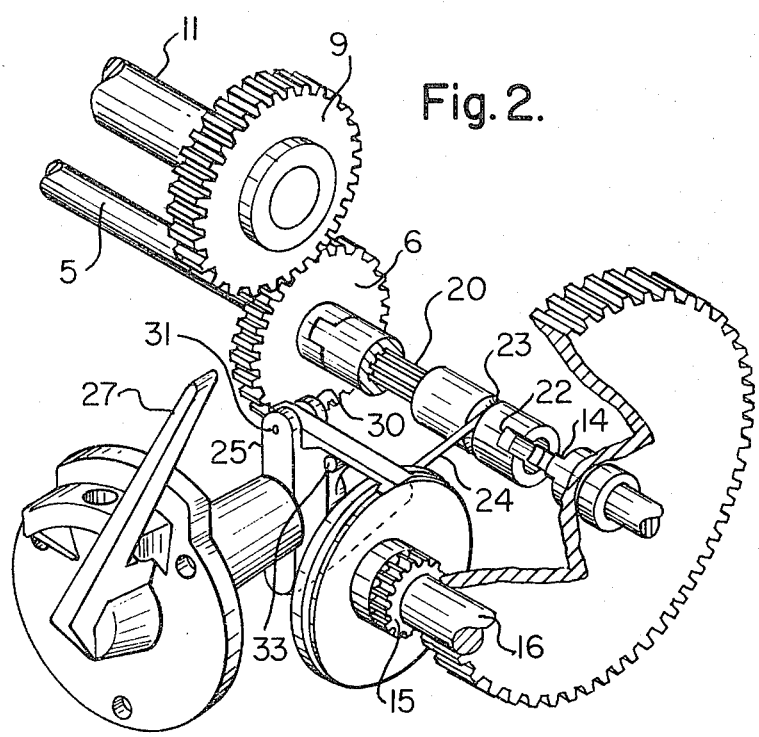
FIG. 2 is a perspective view of the shifting apparatus shown in FIG. 1 with the clutch engaged for hand operation and with some portions removed.

A composite cam 38 is mounted on shaft 16 on the opposite side of gear 15 from motor 17 as shown in FIGS. 1–3. Gear 15 has been omitted from FIGS. 4–9 for simplicity of illustration. Composite cam member 38 comprises a locking cam 39 and a tripping cam 40, each having a circumferential cam surface.

Cam member 38 has two circumferential surfaces. Locking cam 39 is substantially circular and is concentric with shaft 16. Tripping cam 40 is substantially circular but is of smaller diameter than locking cam 39. Tripping cam 40 is eccentric to shaft 15 and is tangent to locking cam 39 at a point 41. Tripping cam 40 is on the side of cam member 38 which is engaged by lip 35 of latch 29.

Shafts 5, 11 and 16 are mounted in conventional manner in a surrounding casing (not shown in the drawings) which is bolted on to the top of the valve stem 1 as shown in FIG. 1. The shaft upon which handle 27 and arm 25 is mounted is rotatially fitted within the housing 42 which is fastened to the surrounding casing. Handle 27 and hand crank 10 are outside the casing and may be reached by a workman at the valve.

Clutch 18 is normally in motor operation position as shown in FIGS. 1 and 3. If power is applied to motor 17 it will rotate shaft 16, gear 15 and gear 12. Power will be transmitted from gear 12 through clutch projection 14 and clutch jaw 22 to clutch member 18, then through splines 19 and 20 to shaft 5. Rotation of shaft 5 will cause valve stem 1 to be moved in or out of the valve through worm 4, worm gear 3, and stem nut 2. Reversing the direction of rotation of motor 17 will cause valve stem 1 to move in the opposite direction.

Since gear 6 is rotatably mounted upon shaft 5 rotation of shaft 5 from motor 17 will not cause gear 6 to rotate. There is, therefore, no motion of the handwheel and crank 10 when motor 17 is driving and clutch member 18 engages motor input gear 12.

Figure 4:
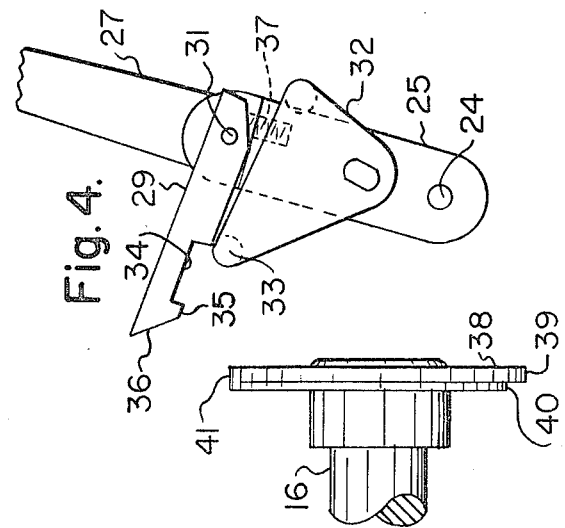
FIG. 4 shows the clutch shifting handle and latch in motor position.
Figure 5:
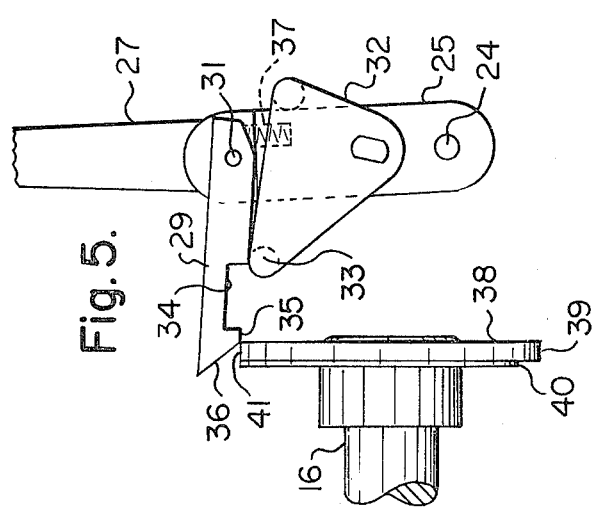
FIG. 5 shows the clutch shifting handle moved partially to hand position.
Figure 6:
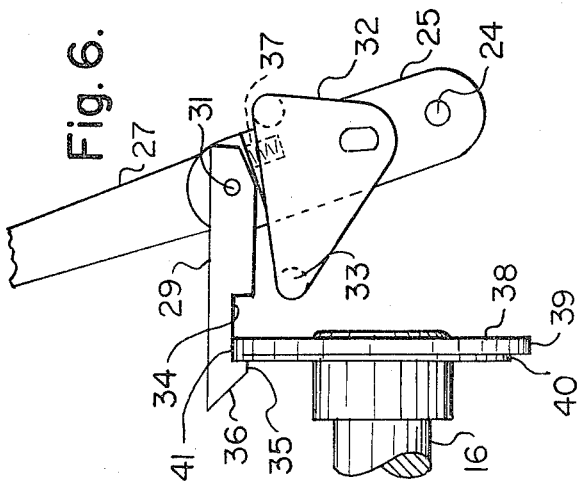
FIG. 6 shows the clutch shifting handle when the clutch is latched in hand position against a cam driven by the motor input.
Figure 9:
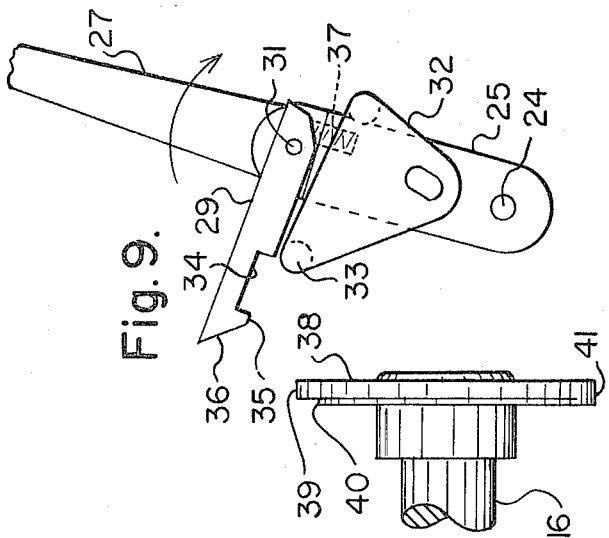
FIG. 9 shows the clutch shifting handle returning to motor position.

It may be necessary to operate the valve by hand crank 10 due to a power failure or a control failure. In that event handle 27 is rotated from motor position as shown in FIG. 3 to hand position as shown in FIG. 2. Spring 28 will resist the movement and must be overcome by rotational force applied to handle 27. When handle 27 is in motor position latch 29 will be free of cam 38 as shown in FIGS. 1, 3 and 4. When handle 27 is rotated toward hand position against the force of spring 28 the sloped end 36 of latch 29 will engage and ride over the surfaces of composite cam 38 as shown in FIG. 5. When handle 27 is moved completely to hand position, lip 35 will ride over both locking cam 39 and tripping cam 40 as shown in FIG. 6. Catch 29 will be moved pivotally about pivot pin 31 by cam 38 thereby compressing spring 37.

Turning of handle 27 to hand position will also rotate arm 25 causing pin 24 to move away from motor input gear 12 and toward hand input gear 6. Movement of pin 24 which is resting in groove 23 will move clutch member 18 out of engagement with motor input gear 12 and toward engagement with hand input gear 6. If clutch projection 21 is aligned with jaw 8, the clutch will engage hand input gear 6 upon movement of handle 27. If projection 21 is not in alignment with jaw 8, the lost motion will permit misalignment until rotation of hand input gear 6 allows the clutch to engage.

When handle 27 and clutch member 18 are in hand position, the valve may be hand operated. Turning crank 10 will rotate shaft 11, gear 9, gear 6, and clutch member 18 from which power is transmitted to the valve stem in the same way as for motor operation.

Figure 8:
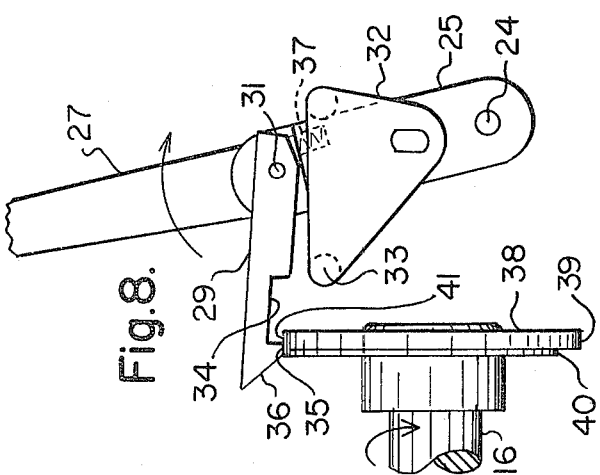
FIG. 8 shows the clutch shifting handle being released by movement of the cam.
Figure 7:
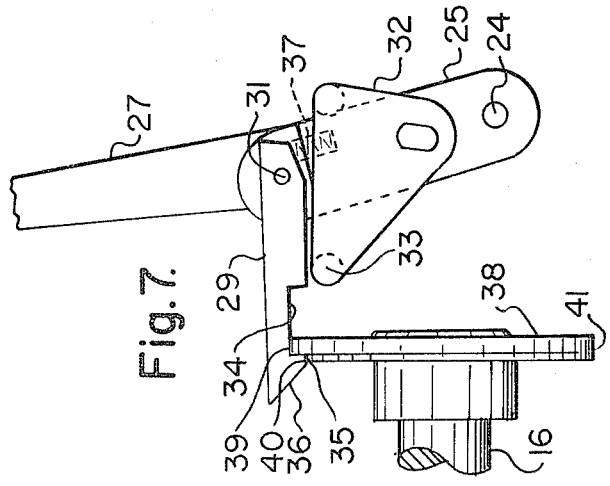
FIG. 7 shows the clutch shifting handle latched in hand position with the cam moved to a different position.

When the valve control returns to motor operation, the shift apparatus automatically shifts from hand drive to motor drive. When power is applied to the motor, shaft 16 will be rotated causing cam member 38 also to rotate. If cam 38 is in the position shown in FIG. 6 before power is applied to motor 17, latch 29 will be held in position by both locking cam 39 and tripping cam 40. When power is applied to the motor a one-half evolution of shaft 16 will cause the surface of tripping cam 40 to move away from lip 35. Under force of spring 28 latch 29 will move slightly to be restrained by locking cam 39 as shown in FIG. 7. A further one-half evolution of shaft 16 and cam member 38 will return the cam member to the position shown in FIGS. 6 and 8. The face of tripping cam 40 will bear against lip 35 of latch 29 and will lift latch 29 clear of locking cam 39 as shown in FIG. 8. Spring 28 will then rotate arm 25 and handle 27, returning them to motor position and engaging clutch member 18 with motor input gear 12. If cam member 38 is in the position shown in FIG. 7 when handle 27 is moved to hand position, then only one-half revolution of shaft 16 is required to return the clutch member to motor operation.

While we have illustrated and described a present preferred embodiment of our invention, it is to be understood that the invention is not limited thereto and may be otherwise variously practiced within the scope of the following claims.

We claim:

1. Drive shifting apparatus for a valve control and the like comprising motor means, a motor input member, a hand input member, an output member, a clutch member shiftable between a position coupling the motor input member to the output member and a position coupling the hand input member to the output member, spring means urging the clutch member to the position coupling the motor input member to the output member independently of operation of the hand input member, cam means driven by the motor means, said cam means being mounted on an axis separate from the axial mounting of the clutch member and driven directly from the motor means, and latch means engaging the cam means when the clutch member is shifted to position coupling the hand input member to the output member, said latch means being disengaged by operation of the cam means whereby motor operation restores the clutch member to position coupling the motor input member with the output member.

2. The apparatus of claim 1 in which the cam means comprises a locking cam and a tripping cam.

3. Drive shifting apparatus for a valve control and the like comprising motor means, a motor input member, a hand input member, an output member, a clutch member shiftable between a position coupling the motor input member to the output member and a position coupling the hand input member to the output member, spring means urging the clutch member to the position coupling the motor input member to the output member, cam means driven by the motor means, said cam means comprising a rotary cam mounted on an axis separate from the axial mounting of the clutch member and having a locking surface and a tripping surface which is eccentric to the locking surface and periodically lifts the latch member clear of the locking surface, and latch means engaging the cam means when the clutch member is shifted to position coupling the hand input member to the output member, said latch means being disengaged by operation of the cam means whereby motor operation restores the clutch member to position coupling the motor input member with the output member.

4. The apparatus of claim 3 in which the clutch member is mounted on the output member by a sliding splined connection.

5. Drive shifting apparatus for a valve control and the like comprising a drive motor, a motor driven clutch element in engagement with the drive motor, a hand driven member, a hand driven clutch element in engagement with the hand driven member, an output shaft, a clutch member splined to the output shaft and slidable therealong alternatively to engage the motor driven clutch element and the hand driven clutch element, cam means on the motor shaft, clutch shifting means, spring means urging the clutch shifting means to motor drive position independently of operation of the hand driven member, and latch means connected to the clutch shifting means and engaging the cam means when the clutch member is moved to hand drive position.

6. The apparatus of claim 5 in which latch means includes a lip which overhangs the edge of the cam when the clutch is moved to hand drive position.

7. The apparatus of claim 6 in which the cam comprises a locking surface and a tripping surface which moves toward and away from the lip of the latch upon rotation of the cam whereby rotation of the cam releases the latch.

8. Drive shifting apparatus for a powered valve control comprising a motor input shaft, a hand input shaft, an output shaft, a clutch engaging surface associated with each input shaft, clutch means in driving relationship to the output shaft and shiftable between a position to engage the hand input shaft clutch engaging surface and a position to engage the motor input shaft clutch engaging surface, spring means urging the clutch means into engagement with the motor input shaft, clutch shift means in engagement with the clutch means and operable against the force of the spring means to shift the clutch means away from engagement with the motor input shaft and into engagement with the hand input shaft, rotatable cam means having an axis of rotation separate from the axis of the output shaft and in driven relationship to the motor input shaft, at least two surfaces on the cam means, one surface being eccentric to the other, and latch means connected to and movable with the shift means to engage the cam means when the clutch means is in hand position whereby the clutch means is held in engagement with the hand input shaft, said latch means being disengaged by rotation of the cam means whereby the clutch means are urged by the spring means into engagement with the motor input shaft.

* * * * *

UNITED STATES PATENT AND TRADEMARK OFFICE
CERTIFICATE OF CORRECTION

PATENT NO. : 4,429,591
DATED : February 7, 1984
INVENTOR(S) : Howard W. Zuch and Paul Weber It is certified that error appears in the above-identified patent and that said Letters Patent is hereby corrected as shown below:

On the Title Page, the assignee should be --EIM Company, Inc.--

Signed and Sealed this

Ninth Day of October 1984

[SEAL]

Attest:

GERALD J. MOSSINGHOFF

*Attesting Officer*  *Commissioner of Patents and Trademarks*